(12) United States Patent
Richards (10) Patent No.: US 7,224,913 B2
(45) Date of Patent: May 29, 2007

(54) PRINTING SYSTEM AND SCHEDULING METHOD

(75) Inventor: Austin L. Richards, WheatHampstead (GB)

(73) Assignee: Xerox Corporation, Stamford, CT (US)

( * ) Notice: Subject to any disclaimer, the term of this patent is extended or adjusted under 35 U.S.C. 154(b) by 182 days.

(21) Appl. No.: 11/122,420

(22) Filed: May 5, 2005

(65) Prior Publication Data

US 2006/0250636 A1 Nov. 9, 2006

(51) Int. Cl.
*G03G 15/00* (2006.01)

(52) U.S. Cl. .......................... 399/16; 358/1.15; 399/9; 700/100

(58) Field of Classification Search .................. 399/82, 399/8, 9, 16, 83, 407; 358/1.13, 1.14, 1.15; 700/100, 101
See application file for complete search history.

(56) References Cited

U.S. PATENT DOCUMENTS

| | | | |
|---|---|---|---|
| 4,579,466 A | 4/1986 | Sato | |
| 4,587,532 A | 5/1986 | Asano | |
| 4,836,119 A | 6/1989 | Siraco | |
| 4,972,236 A * | 11/1990 | Hasegawa | .................... 399/16 |
| 5,004,222 A | 4/1991 | Dobashi | |
| 5,080,340 A | 1/1992 | Hacknauer | |
| 5,095,342 A | 3/1992 | Farrell | |
| 5,150,167 A * | 9/1992 | Gonda et al. | .................. 399/16 |
| 5,159,395 A | 10/1992 | Farrell | |
| 5,208,640 A | 5/1993 | Horie | |
| 5,272,511 A | 12/1993 | Conrad | |
| 5,326,093 A | 7/1994 | Sollitt | |
| 5,389,969 A | 2/1995 | Suzuki | |
| 5,435,544 A | 7/1995 | Mandel | |
| 5,473,419 A | 12/1995 | Russel | |
| 5,504,568 A | 4/1996 | Saraswat | |
| 5,525,031 A | 6/1996 | Fox | |
| 5,548,375 A * | 8/1996 | Mitsuya et al. | ................. 399/9 |
| 5,557,367 A | 9/1996 | Yang | |
| 5,568,246 A | 10/1996 | Keller | |
| 5,570,172 A | 10/1996 | Acquaviva | |
| 5,596,416 A | 1/1997 | Barry | |
| 5,629,762 A | 5/1997 | Mahoney | |
| 5,646,740 A * | 7/1997 | Webster et al. | ........ 358/1.15 X |
| 5,710,968 A | 1/1998 | Clark | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Sophia S. Chen
(74) *Attorney, Agent, or Firm*—Fay Sharpe LLP (57) ABSTRACT

A printing system and method includes at least two modules, at least one of which is a marking engine module. In the method, one or more sheets to be printed are submitted. Available paths are determined for one of the one or more sheets and a preferred available path is determined and submitted to one or more of the plurality of modules. A reservation matrix representative of the one of the one or more sheets being scheduled on the preferred available path is updated. The steps of determining the available paths, determining a preferred available path, submitted the preferred available path and updating the reservation matrix are repeated for each subsequent sheet of the one or more sheets of the print job.

20 Claims, 4 Drawing Sheets

U.S. PATENT DOCUMENTS

| | | | |
|---|---|---|---|
| 5,778,377 | A | 7/1998 | Marlin |
| 5,884,910 | A | 3/1999 | Mandel |
| 5,995,721 | A | 11/1999 | Rourke |
| 6,059,284 | A | 5/2000 | Wolf |
| 6,125,248 | A | 9/2000 | Moser |
| 6,241,242 | B1 | 6/2001 | Munro |
| 6,297,886 | B1 | 10/2001 | Cornell |
| 6,341,773 | B1 | 1/2002 | Aprato et al. |
| 6,363,231 | B1* | 3/2002 | Manzer et al. ............... 399/82 |
| 6,384,918 | B1 | 5/2002 | Hubble, III |
| 6,450,711 | B1 | 9/2002 | Conrow |
| 6,476,376 | B1 | 11/2002 | Biegelsen |
| 6,476,923 | B1 | 11/2002 | Cornell |
| 6,493,098 | B1 | 12/2002 | Cornell |
| 6,537,910 | B1 | 3/2003 | Burke |
| 6,550,762 | B2 | 4/2003 | Stoll |
| 6,554,276 | B2 | 4/2003 | Jackson |
| 6,577,925 | B1 | 6/2003 | Fromherz |
| 6,607,320 | B2 | 8/2003 | Bobrow |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon |
| 6,633,382 | B2 | 10/2003 | Hubble, III |
| 6,639,669 | B2 | 10/2003 | Hubble, III |
| 6,819,906 | B1 | 11/2004 | Herrmann |
| 2002/0078012 | A1 | 6/2002 | Ryan |
| 2002/0103559 | A1 | 8/2002 | Gartstein |
| 2003/0077095 | A1 | 4/2003 | Conrow |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz |
| 2004/0150158 | A1 | 8/2004 | Biegelsen |
| 2004/0151513 | A1* | 8/2004 | Nomura ..................... 399/8 |
| 2004/0153983 | A1 | 8/2004 | McMillan |
| 2004/0216002 | A1 | 10/2004 | Fromherz |
| 2004/0225391 | A1 | 11/2004 | Fromherz |
| 2004/0225394 | A1 | 11/2004 | Fromherz |
| 2004/0247365 | A1 | 12/2004 | Lofthus et al. |
| 2006/0222393 | A1* | 10/2006 | de Jong et al. ............... 399/67 |

OTHER PUBLICATIONS

Desmond Fretz, "Cluster Printing Solution Announced", Today at Xerox (TAX), No. 1129, Aug. 3, 2001.

U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/002,528, filed Dec. 2, 2004, Lofthus et al.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.

* cited by examiner

PRINTING SYSTEM AND SCHEDULING METHOD

BACKGROUND

The present exemplary embodiment relates generally to a printing system comprising at least two marking engines and, more particularly, to a scheduling system and method for use in conjunction with a printing system comprising at least two marking engines. It finds particular application in conjunction with scheduling sheets of print jobs in a multi-marking engine printing system for maximizing output of the printing system and will be described with particular reference thereto. However, it is to be appreciated that the present exemplary embodiment is also amenable to other like applications.

In a typical xerographic marking engine, such as a copier, printer, combination copier/printer, etc., a photoconductive insulating member is charged to a substantially uniform potential and thereafter exposed to a light image representative of a document to be produced. This exposure discharges the photoconductive insulating surface in exposed or background areas and creates an electrostatic latent image on the member, corresponding to image areas of the document to be produced. Subsequently, the electrostatic latent image on the photoconductive insulating surface is made visible by developing the image with developing powder referred to in the art as toner. This developed image may be subsequently transferred to a print medium, such as a sheet of copy paper, to which it may be permanently affixed by heating and/or by the application of pressure, i.e., fusing.

Electronic printing systems, including those that employ one or more xerographic marking engines as generally described above, can sometimes employ a scanner for scanning image-bearing documents, i.e., source documents, and conversion electronics for converting an image scanned from a source document to image signals or pixels. Alternatively, image signals or pixels representative of an image or document to be printed can be generated directly on a computer or like device, without the need for a source document. In either case, the signals are typically stored and read out successively to the printing system for formation of the images on photoconductive output media, such as a photoreceptor, and ultimately transfer to a support substrate, such as described above.

A common trend in the maintenance of office equipment, particularly copiers and printers, is to organize the printing system on a modular basis, wherein certain distinct subsystems of the printing system are bundled together into modules which can be readily removed and replaced with new modules, often of the same type. For example, the printing system could comprise two or more marking engine modules and a finisher module. Modular designed printing systems facilitate greater flexibility in terms of replacement and repair, and can even allow repairs of individual modules to take place at remote locations without necessitating disabling of the entire printing system.

Incorporated by reference, by way of background and where appropriate, are the following references relating to what have been variously called "tandem engine" printers, "cluster printing," "output merger" and the like: U.S. Pat. No. 4,579,446; U.S. Pat. No. 4,587,532; U.S. Pat. No. 5,272,511; U.S. Pat. No. 5,568,246; U.S. Pat. No. 5,570,172; U.S. Pat. No. 5,995,721; U.S. Pat. No. 5,596,416; U.S. Pat. No. 6,402,136; U.S. patent application Ser. No. 10/785,211 by Lofthus, et al., filed Feb. 24, 2004 and entitled UNIVERSAL FLEXIBLE PLURAL PRINTER TO PLURAL FINISHER SHEET INTEGRATION SYSTEM; U.S. patent application Ser. No. 10/860,915 by Lofthus, et al., filed Jun. 3, 2004 and entitled UNIVERSAL FLEXIBLE PLURAL PRINTER TO PLURAL FINISHER SHEET INTEGRATION SYSTEM; a 1991 "Xerox Disclosure Journal" publication of November-December 1991, Vol. 16, No. 6, pp. 381-383; and the Xerox Aug. 3, 2001 "TAX" publication product announcement entitled "Cluster Printing Solution Announced."

Printing systems employing multiple print engines often enable higher print speeds or print rates than heretofore realized by grouping a plurality of print engines together. These systems have been found to be very cost competitive and provide an additional advantage over single engine systems as a result of their inherent redundancy. For example, if one print engine fails or is unusable, the printing system is still able to function, possible at a reduced output rate, by using the remaining print engine or engines. One challenge in these systems is scheduling of print jobs and, more particularly, scheduling of individual sheets of print jobs through the various modules, including multiple modules each including a print engine, in an organized and efficient manner.

Various methods of scheduling print jobs and print media sheets of print jobs in a printing system employing multiple print engines are known. For example, U.S. Pat. No. 5,095,342 to Rarrell et al.; U.S. Pat. No 5,095,369 to Ortiz; U.S. Pat. No. 5,159,395 to Farrell; U.S. Pat. No. 5,557,367 to Yang et al.; U.S. Pat. No. 6,097,500 to Fromherz; U.S. Pat. No. 6,618,167 to Shah; 6,836,339 to Purvis et al.; and U.S. Pat. No. 6,850,336 to Purvis et al.; U.S. patent application Ser. No. 10/924,458 to Lofthus et al.; and U.S. patent application Ser. Nos. 20/384,514; 10/248,560; 10/284,561; and 10/424,322, all to Fromherz, all of which are incorporated herein in their entireties by reference., disclose exemplary scheduling systems. In particular, the '339 patent and the '336 patent disclose a scheduler for a printing machine to schedule the processing of sheets through the several modules of the printing machine.

CROSS-REFERENCE TO RELATED APPLICATION(S)

The following applications, the disclosures of each being totally incorporated herein by reference are mentioned:

U.S. Provisional Application Ser. No. 60/631,651 filed Nov. 30, 2004, entitled "TIGHTLY INTEGRATED PARALLEL PRINTING ARCHITECTURE MAKING USE OF COMBINED COLOR AND MONOCHROME ENGINES," by David G. Anderson, et al.;

U.S. Provisional Patent Application Ser. No. 60/631,918 filed Nov. 30, 2004, entitled "PRINTING SYSTEM WITH MULTIPLE OPERATIONS FOR FINAL APPEARANCE AND PERMANENCE," by David G. Anderson et al.;

U.S. Provisional Patent Application Ser. No. 60/631,921 filed Nov. 30, 2004, entitled "PRINTING SYSTEM WITH MULTIPLE OPERATIONS FOR FINAL APPEARANCE AND PERMANENCE," by David G. Anderson et al.;

U.S. application Ser. No. 10/761,522 filed Jan. 21, 2004, entitled "HIGH RATE PRINT MERGING AND FINISHING SYSTEM FOR PARALLEL PRINTING," by Barry P. Mandel, et al.;

U.S. application Ser. No. 10/785,211 filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. application Ser. No. 10/881,619 filed Jun. 30, 2004, entitled "FLEXIBLE PAPER PATH USING MULTIDIRECTIONAL PATH MODULES," by Daniel G. Bobrow.;

U.S. application Ser. No. 10/917,676 filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/917,768 filed Aug. 13, 2004, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. application Ser. No. 10/924,106 filed Aug. 23, 2004, entitled "PRINTING SYSTEM WITH HORIZONTAL HIGHWAY AND SINGLE PASS DUPLEX," by Lofthus, et al.;

U.S. application Ser. No. 10/924,113 filed Aug. 23, 2004, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458 filed Aug. 23, 2004, entitled "PRINT SEQUENCE SCHEDULING FOR RELIABILITY," by Robert M. Lofthus, et al.;

U.S. application Ser. No. 10/924,459 filed Aug. 23, 2004, entitled "PARALLEL PRINTING ARCHITECTURE USING IMAGE MARKING ENGINE MODULES (as amended)," by Barry P. Mandel, et al;

U.S. application Ser. No. 10/933,556 filed Sep. 3, 2004, entitled "SUBSTRATE INVERTER SYSTEMS AND METHODS," by Stan A. Spencer, et al.;

U.S. application Ser. No. 10/953,953 filed Sep. 29, 2004, entitled "CUSTOMIZED SET POINT CONTROL FOR OUTPUT STABILITY IN A TIPP ARCHITECTURE," by Charles A. Radulski et al.;

U.S. application Ser. No. 10/999,326 filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450 filed Nov. 30, 2004, entitled "ADDRESSABLE FUSING FOR AN INTEGRATED PRINTING SYSTEM," by Robert M. Lofthus, et al.;

U.S. application Ser. No. 11/000,158 filed Nov. 30, 2004, entitled "GLOSSING SYSTEM FOR USE IN A TIPP ARCHITECTURE," by Bryan J. Roof;

U.S. application Ser. No. 11/000,168 filed Nov. 30, 2004, entitled "ADDRESSABLE FUSING AND HEATING METHODS AND APPARATUS," by David K. Biegelsen, et al.;

U.S. application Ser. No. 11/000,258 filed Nov. 30, 2004, entitled "GLOSSING SYSTEM FOR USE IN A TIPP ARCHITECTURE," by Bryan J. Roof;

U.S. application Ser. No. 11/001,890 filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/002,528 filed Dec. 2, 2004, entitled "HIGH RATE PRINT MERGING AND FINISHING SYSTEM FOR PARALLEL PRINTING," by Robert M. Lofthus, et al.;

U.S. application Ser. No. 11/051,817 filed Feb. 4, 2005, entitled "PRINTING SYSTEMS," by Steven R. Moore, et al.;

U.S. application Ser. No. 11/069,020 filed Feb. 28, 2004, entitled "PRINTING SYSTEMS," by Robert M. Lofthus, et al.;

U.S. application Ser. No. 11/070,681 filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473 filed Mar. 16, 2005, entitled "PRINTING SYSTEM," by Steven R. Moore;

U.S. application Ser. No. 11/084,280 filed Mar. 18, 2005, entitled "SYSTEMS AND METHODS FOR MEASURING UNIFORMITY IN IMAGES," by Howard Mizes;

U.S. application Ser. No. 11/089,854 filed Mar. 25, 2005, entitled "SHEET REGISTRATION WITHIN A MEDIA INVERTER," by Robert A. Clark et al.;

U.S. application Ser. No. 11/090,498 filed Mar. 25, 2005, entitled "INVERTER WITH RETURN/BYPASS PAPER PATH," by Robert A. Clark;

U.S. application Ser. No. 11/090,502 filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/093,229 filed Mar. 29, 2005, entitled "PRINTING SYSTEM," by Paul C. Julien;

U.S. application Ser. No. 11/095,872 filed Mar. 31, 2005, entitled "PRINTING SYSTEM," by Paul C. Julien;

U.S. application Ser. No. 11/094,864 filed Mar. 31, 2005, entitled "PRINTING SYSTEM," by Jeremy C. deJong, et al.;

U.S. application Ser. No. 11/095,378 filed Mar. 31, 2005, entitled "IMAGE ON PAPER REGISTRATION ALIGNMENT," by Steven R. Moore, et al.;

U.S. application Ser. No. 11/094,998 filed Mar. 31, 2005, entitled "PARALLEL PRINTING ARCHITECTURE WITH PARALLEL HORIZONTAL PRINTING MODULES," by Steven R. Moore, et al.;

U.S. application Ser. No. 11/102,899 filed Apr. 8, 2005, entitled "SYNCHRONIZATION IN A DISTRIBUTED SYSTEM," by Lara S. Crawford, et al.;

U.S. application Ser. No. 11/102,910 filed Apr. 8, 2005, entitled "COORDINATION IN A DISTRIBUTED SYSTEM," by Lara S. Crawford, et al.;

U.S. application Ser. No. 11/102,355 filed Apr. 8, 2005, entitled "COMMUNICATION IN A DISTRIBUTED SYSTEM," by Markus P. J. Fromherz, et al.;

U.S. application Ser. No. 11/102,332 filed Apr. 8, 2005, entitled "ON-THE-FLY STATE SYNCHRONIZATION IN A DISTRIBUTED SYSTEM," by Haitham A. Hlndi;

U.S. application Ser. No. 11/109,558 filed Apr. 19, 2005, entitled "SYSTEMS AND METHODS FOR REDUCING IMAGE REGISTRATION ERRORS," by Furst et al.;

U.S. application Ser. No. 11/109,566 filed Apr. 19, 2005, entitled "MEDIA TRANSPORT SYSTEM," by Mandel et al.;

U.S. application Ser. No. 11/109,996 filed Apr. 20, 2005, entitled "PRINTING SYSTEMS," by Mongeon et al.; and U.S. application Ser. No. 11/115,766 Filed Apr. 27, 2005, entitled "IMAGE QUALITY ADJUSTMENT METHOD AND SYSTEM," by Grace.

BRIEF DESCRIPTION

In one exemplary embodiment, a method is provided for scheduling in a printing system comprising a plurality of modules. In the method, a print job comprising one or more sheet to be printed is submitted to the printing system. Available paths are determined for one of the one or more sheets of the print job. A preferred available path for said one of the one or more sheets of the print job is determined from the available paths. The preferred available path for said one of the one or more sheets of the print job is submitted to one or more of the plurality of modules. A reservation matrix representative of said one of the one or more sheets being scheduled on the preferred available path is updated. The steps of determining the available paths, determining a preferred available path, submitted the preferred available path and updating the reservation matrix are repeated for each subsequent sheet of the one or more sheets of the print job.

In another exemplary embodiment, a printing system is provided. The printing system includes at least two modules, including at least one marking engine module. The printing system also includes a data source having image data which is to be printed on one or more print media sheets and a scheduler which is linked to the data source and linked to the at least two modules for scheduling processing of the one or more print media sheets through the at least two modules.

In still another exemplary embodiment, a xerographic system is provided. The xerographic system includes a first marking engine module which applies images to print media sheets and a second marking engine module which also applies images to print media sheets. A scheduler is linked to the first and second marking engine modules for receiving a print job and scheduling sheets of said print job through the first and second marking engine modules to minimize time of the sheets passing through the first and second marking engine modules.

DETAILED DESCRIPTION

Figure 1:
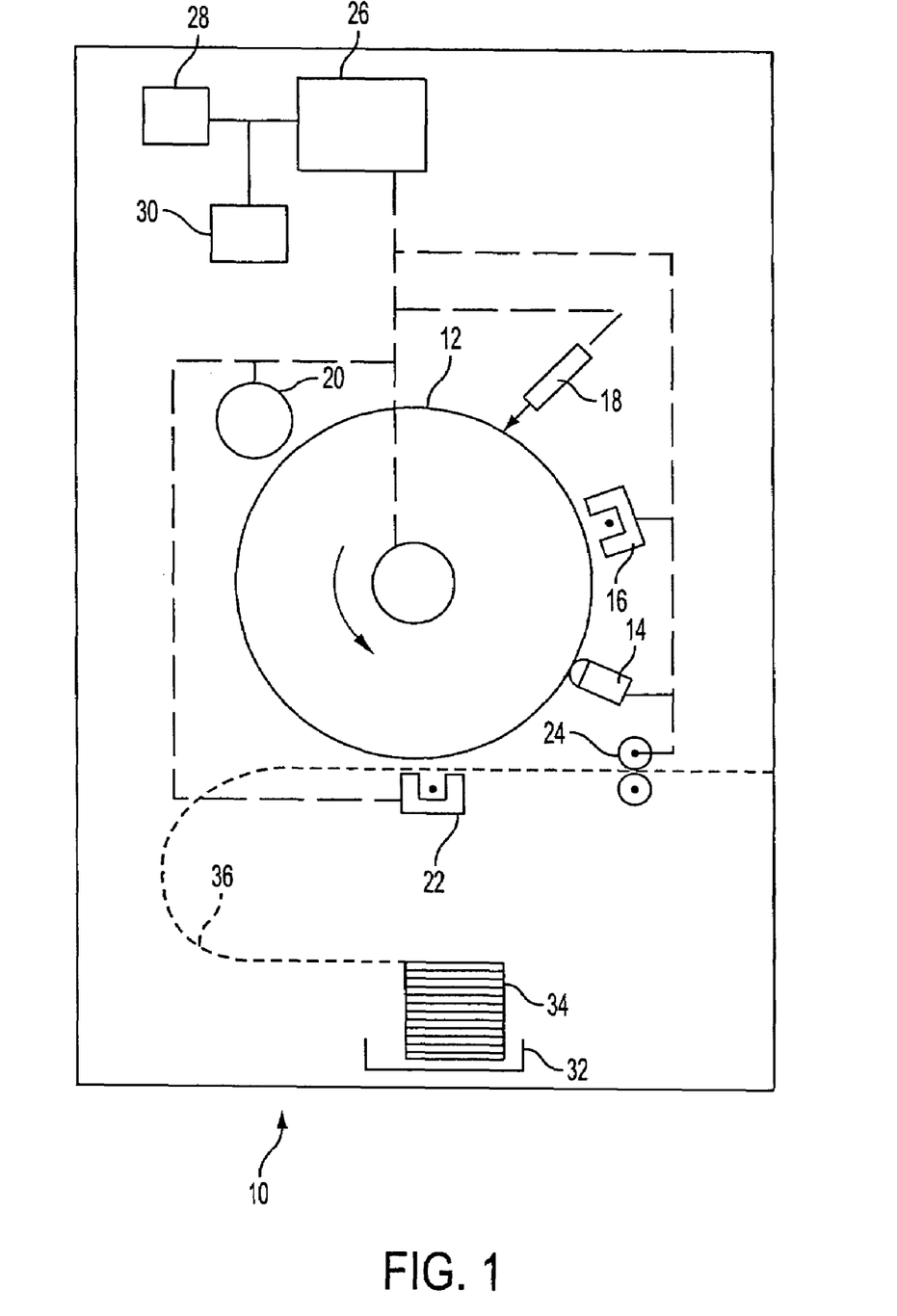
FIG. 1 is a schematic view of an image marking engine module.

Referring now to the drawings wherein the showings are for purposes of illustrating one or more exemplary embodiments, a marking engine module is schematically depicted in FIG. 1 and generally indicated by reference numeral 10. In one application, as will be described in more detail below, the marking engine module 10 can serve as a replaceable xerographic module in a printing system. The term "marking engine" is used in connection with the one or more exemplary embodiments discussed herein to generally refer to a device for applying an image to print media. The marking engine module 10 of FIG. 1 includes many of the hardware elements or components-employed in the creation of desired images by electrophotographical processes, as will be known and understood by those skilled in the art. In the illustrated embodiment, the marking engine module 10 includes a charge retentive surface member, such as rotating photoreceptor 12 in the form of a drum (alternatively, the rotating photoreceptor could be a belt or other rotating device having a charge retentive surface).

As also known and understood by those skilled in the art, images can be created on the photoreceptor 12 and ultimately transferred from the photoreceptor 12 to print media, such as a sheet of paper. The term "print media" is used in connection with the one or more exemplary embodiments discussed herein to generally refer to a usually flimsy physical sheet of paper, plastic, or other suitable physical print media substrate for images, whether precut or web fed. Disposed about the photoreceptor 12 are various xerographic subsystems, including a cleaning device or station 14, a charging station 16, an exposure station 18, which forms a latent image on the photoreceptor 12, a developer 20 for developing the latent image by applying a toner thereto to form a toner image, a transferring unit, such as a transfer corotron 22, which transfers the toner image thus formed to the print media, and a fuser 24, which fuses the transferred image to the print media. In the illustrated embodiment, the fuser 24 is adapted to apply at least one of heat and pressure to the print media to physically and permanently attach the toner and optionally to provide a level of gloss to the printed media. In any particular embodiment of an electrophotographic marking engine module, there can be variations to that described above, such as, for example, additional corotrons, cleaning devices, or, in the case of a color printer, multiple developers.

The xerographic subsystems 14,16,18,20,22,24 of the illustrated embodiment are controlled by a marking engine controller 26, such as a CPU. Though the controller 26 of the illustrated embodiment is schematically shown as a single unit, it is to be appreciated that the controller can be distributed throughout the marking engine module 10 and formed of multiple remotely positioned components. For example, actuators forming the controller 26 can be located in or on the xerographic subsystems and thus the controller is not necessarily physically removed from or separate from other elements of the module 10. In the illustrated embodiment, the marking engine controller 26 is linked to an input/output interface 28 and a memory 30, and may also be linked to other components known by those skilled in the art to be provided with a marking engine module, such as, for example, a marking cartridge platform, a marking driver, a function switch, sensors (such as an "out of paper" indicator), a self-diagnostic unit, all of which can be interconnected by a data/control bus.

While the illustrated embodiment shows an electrophotographic printer marking engine module and particular reference herein is made to module 10 which includes an electrophotographic marking engine, suitable marking engines/modules can alternatively include ink-jet printers, including solid ink printers, thermal head printers that are used in conjunction with heat sensitive paper, and other devices capable of marking an image on a substrate. It is to be appreciated that such alternative marking engines/modules can, like module 10, also include an input/output interface, a memory, a marking cartridge platform, a marking driver, a function switch, sensors, a controller and a self-diagnostic unit, all of which can be interconnected by a data/control bus. Additionally, it is to be appreciated that a single marking engine module, such as module 10, could include multiple marking engines, in alternate embodiments.

The illustrated marking engine module 10 further includes a print media tray 32 suitable for holding print media, such as a stack 34 of precut print media sheets. As is known and understood by those skilled in the art, print media sheets are fed, typically from the top of the stack 34, along sheet path 36 to the transfer station 22 for receiving the toner image and through the fuser 24 for having the toner image permanently attached thereto. Although not illustrated, it is to be appreciated that the marking engine module 10 could be configured to employ duplex operations on a print media sheet, wherein the sheet could be inverted and then fed for recirculation back through the transfer station 22 and the fuser 24 for receiving and permanently fixing a side two image to the backside of that duplex sheet. It should also be appreciated that module 10 need not be limited to a single print media tray, and could alternatively have no tray wherein the module 10 could be fed by a separate feeder module or could have two or more trays, such as trays for holding print media sheets of varying types (e.g., sizes, material, etc.). In one exemplary example, module 10 and any other marking modules associated with module 10 in a particular printing system can be fed with print media from a single and/or separate print media source, such as a high speed paper feeder, having any number of print media trays, or the multiple marking engine modules could be fed from several print media sources, in lieu of or in addition to the print media tray 32.

Figure 2:
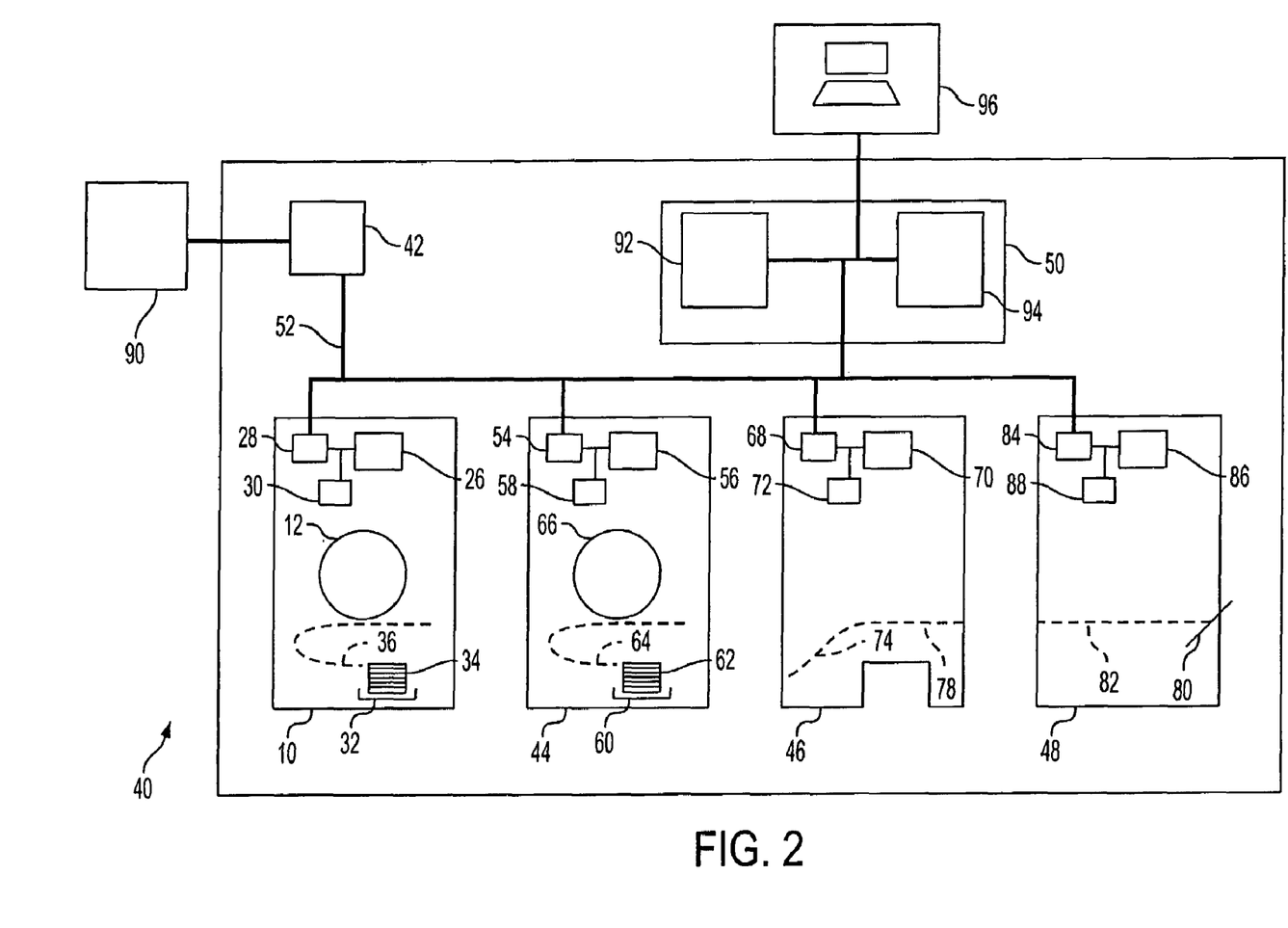
FIG. 2 is a schematic view of a printing system comprising a plurality of image marking engine modules, including the marking engine module of FIG. 1.

With additional reference to FIG. 2, an exemplary printing system 40 is shown including an input/output interface 42, a plurality of marking engine modules, including first marking engine module 10 and second marking engine module 44 in the illustrated embodiment, a transport module 46, a finisher module 48 and a common control system 50, all interconnected by links 52. These links 52 can be wired or wireless links or other means or devices capable of supplying electronic data to and/or from the interconnected elements. For example, the links 52 can be telephone lines, computer cables, ISDN lines, wireless communication means or links (e.g., employing Bluetooth® wireless technology) and the like. While FIG. 2 illustrates an embodiment employing two marking engine modules 10,44, both of which can be similarly configured (i.e., the marking engine module 44 can be like the marking engine module 10), it is to be appreciated that the printing system 40 could include only a single marking engine module or could include more than two modules, such as three, four, five, six, or eight marking engine modules. Like marking module 10, the second marking module 44 includes a second module input/output interface 54 linked to a second module controller 56 and a second module memory 58, as well as a print media tray 60 for holding a stack 62 of print media sheets to be delivered along sheet path 64 to printer drum 66.

As will be described in more detail below, the transport module 46 links or connects the sheet paths 36,64 of the marking engine modules 10,44 to the finisher module 48. In an exemplary embodiment, the transport module 46 is a transport system including a network of flexible print media pathways that collect print media from each of the print modules 10,44 and deliver the collected print media to the finisher module 48. The transport module 46 can include an input/output interface 68 linked to a transport module controller 70 and a transport module memory 72. The transport system of the transport module 46 can comprise drive members or rollers, spherical nips, air jets, or the like (not shown) for moving print media sheets received from the marking engine modules 10,44 to the finisher module 48. The transport system can further include associated motors for the drive members, belts, guide rods, frames, etc. (not shown), which, in combination with the drive members, serve to convey the print media along selected pathways at selected speeds.

As described in more detail below, the paths or pathways 74,78 (see FIG. 3) of the transport module 46 allow print media sheets marked by two or more marking engine modules, such as modules 10,44, to be assembled in a common stream and delivered to a finisher module, such as module 48. It will be appreciated that the marking engine modules employed in the printing system 40, including modules 10,44, can be configured for duplex or simplex printing and that a single sheet of print media can be marked by two or more of the marking engine modules or marked a plurality of times by the same marking engine module, for example, by providing internal duplex pathways. The details of practicing parallel simplex printing and duplex printing through tandemly arranged marking engine modules are known and can be generally appreciated with reference to the foregoing cited U.S. Pat. No. 5,568,246.

The finisher module 48 receives pint media sheets passing through the transport module 46, typically already assembled in a common stream by the transport module 46. The term "finisher" or "finishing module" as broadly used herein in connection with the exemplary embodiment or embodiments disclosed herein, is any post-printing accessory device such as an inverter, reverter, sorter, mailbox, inserter, interposer, folder, stapler, collator, stitcher, binder, over-printer, envelope stuffer, postage machine, output tray, or the like. In the illustrated embodiment, the finisher module 48 includes an output tray 80 (FIG. 3) to which received print media sheets can be delivered along path 82, as well as an input/output interface 84 linked to a finisher controller 86 and a finisher memory 88. The finisher module 48 can provide various finishes to the print media sheets of a print job or jobs, or even a portion of a print job. Finishes can include, for example, patterns of collation, binding or stapling available by the finisher module. Additional, advanced finishes can include, for example, other binding techniques, shrink wrapping, various folding formats, etc. The finisher module 48 can also be provided with multiple output trays (not shown) and the ability to deliver specified print media sheets to a selected output tray or trays.

With continued reference to FIG. 2, a data source 90, such as a computer, network device or scanner can serve as an image input device for the printer system 40 in the illustrated embodiment. In one example, the data source 90 can be a computer network which is used to generate or acquire image signals or pixels and create print jobs therefrom. In another example, such as when on-site image input is desirable, the data source 90 could be or include a scanner which can be used by a user of the printer system 40 to scan image-bearing documents, i.e., source documents. The scanner can include or be used in conjunction with conversion electronics for converting an image scanned from a source document or documents to image signals or pixels and ultimately create print jobs therefrom.

Other sources of image data, each capable of serving as the data source 90, are also contemplated, including floppy discs, hard discs, transportable memory devices, such as flash memory and the like, or any electronic storage medium or device capable of supplying image data. Of course, as will be understood and appreciated by those skilled in the art, the data source 90 need not be limited to a single data source, but could be a plurality of image input devices. For example, the data source could be or include both a network and a scanner. As is known by those skilled in art, the data source 90, whatever its configuration, can additionally be connected or linked to other networks and/or computers (not shown), or other data sources. For example, the data source 90 can be a network server connected or linked to one or more workstations, such as personal computers.

A print job, including the image data of the data source 90, is created, either upstream of the printing system 40 or in the printing system 40 itself. Typically, the print job includes the image data in the form of a plurality of electronic pages and a set of processing instructions. The term "print job" is used in connection with the one or more exemplary embodiments discussed herein to generally refer to a set of related sheets to be printed, usually one or more collated copy sets copied from a set of original document sheets or electronic document page images, from a particular user, or which are otherwise related. Each print job can, for example, include the number of print media sheets to be printed on, the size and type of each print media sheet to be printed on, whether simplex or duplex printing is required, etc. U.S. Pat. No. 5,710,635 to Webster, incorporated herein by reference, describes a representation of an example print job or document and how that representation can be transformed into something the printing system 40 can use to print the job. U.S. Pat. No. 5,604,600 to Webster and U.S. Pat. No. 5,129,639 to DeHority, both incorporated herein by reference, further describe example print job processing.

The control system 50 further includes a scheduling system 92 and a print media path controller 94. The scheduling system 92 schedules the printing of a print job including selection of the marking engine modules to be used (10 or 44 in the illustrated embodiment) and the route of each sheet of the print job through the system 40. As will be described in more detail below, the scheduling system 92 receives one or more print jobs, such as described above and including the image data of the data source 90, or at least the scheduling system 92 receives information corresponding to the one or more print jobs, and therefrom schedules sheets of the one or more print jobs through the modules 10,44, 46,48 of the printing system 40 based on various constraints, such as optimizing the output of the printing system 40. While the operations of the scheduling system 92 are herein described with reference to a single job, it will be appreciated that the scheduling system can consider several print jobs in a queue and can schedule printing of print jobs from the queue contemporaneously or in an optimum sequence to optimize throughput of the printing system 40 or other variables, such as image quality.

The print media path controller 94 routes the sheets through the system, as well as controls the switch positions through the modules in order to execute a print job stream. Specifically, as will be described in more detail below, the print media path controller 94 routes sheets of print media through the system 40 as instructed by the scheduling system 92. A user or operator of the system 40 can communicate with the control system 50 by means of a communication station 96, which can be a touch screen, keypad and display screen, keyboard and monitor or the like.

Figure 3:
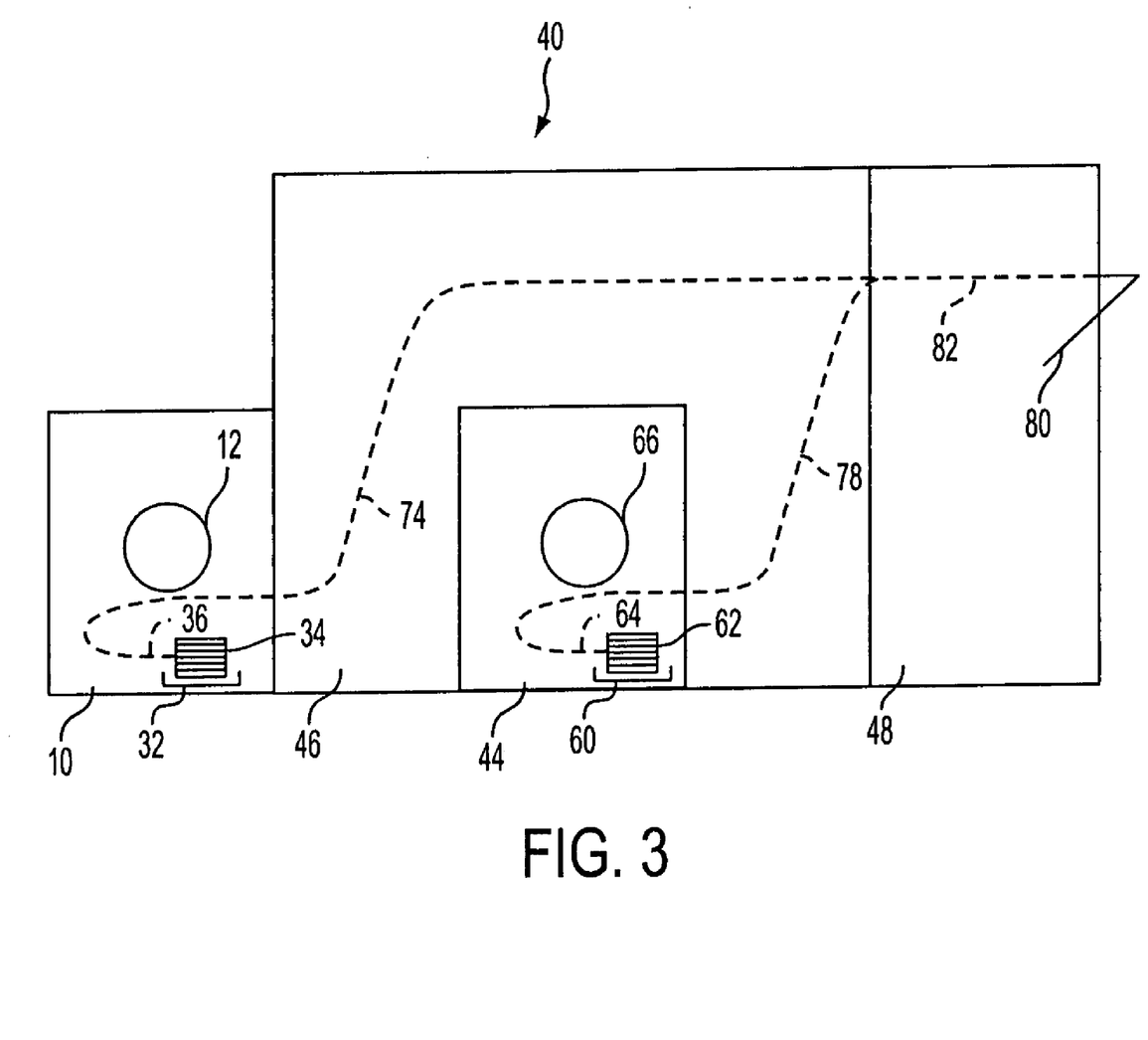
FIG. 3 is a schematic view of the printing system of FIG. 2, showing interconnected print media paths of the printing system.

FIG. 3 schematically illustrates the printing system 40 of FIG. 2 to show the interconnected print media paths 36,64, 74,78,82 through and between the assembled modules 10,44,46,48. In the exemplary printing system 40 of FIG. 3, the marking engine modules 10,44 are shown linked for parallel printing of print media sheets within the system and the transport module 46 is shown connected to the marking modules 10,44 for receiving printed on print media sheets and delivering these to the finisher module 48. Specifically, transport module path 74 connects first marking module path 36 to the finisher path 82 and transport module path 78 connects second marking module path 64 to the finisher path 82.

Figure 4:
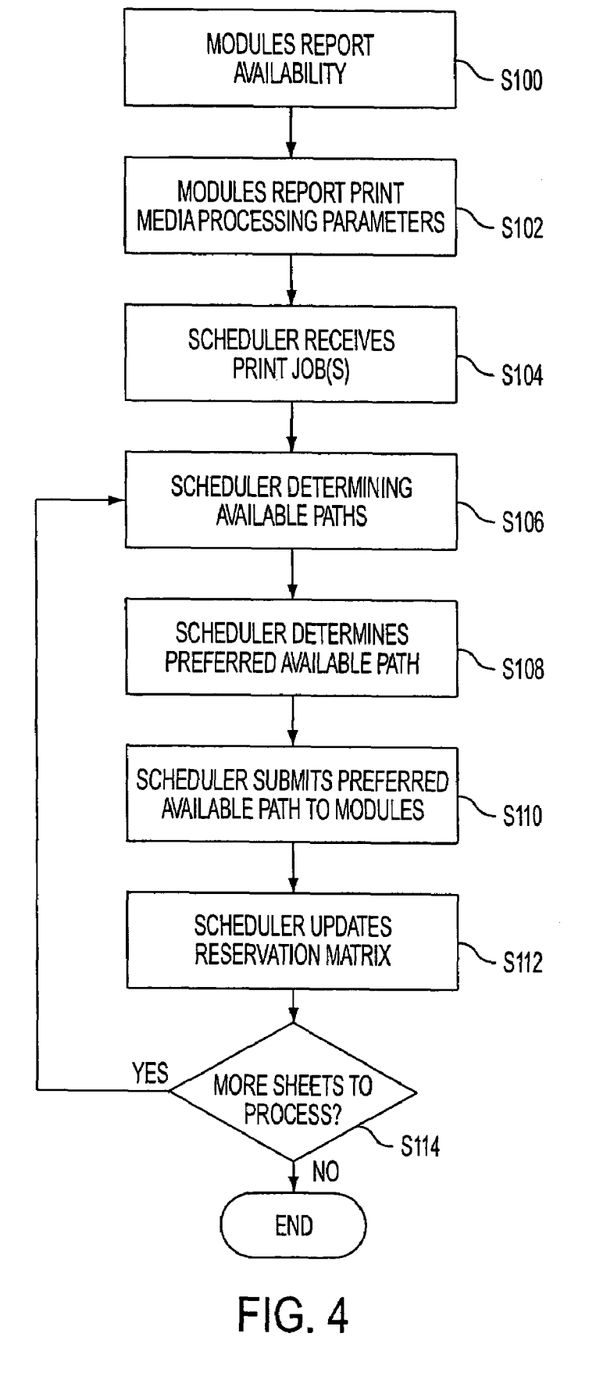
FIG. 4 is a block diagram illustrating a method for scheduling in the printing system of FIGS. 2 and 3.

In operation, with additional reference to FIG. 4, each of one or more modules reports its availability to the control system 50 and, more specifically, the scheduling system 92, also referred to herein as a scheduler 92 (step S100). In the illustrated embodiment, all of the modules 10,44,46,48 individually report whether they are available to the scheduler 92. Reporting of availability could occur when the printing system 40 is first switched on (i.e., powered up) and/or could occur on a continuing basis as the printing system 40 is operated. For example, controller 26 of print engine module 10 could report that module 10 is switched off, out of paper, jammed, etc. to indicate that module 10 is unavailable.

Each of the one or more modules also reports its print media processing parameters to the control system 50 and, more specifically, the scheduler 92 (step S102). Processing parameters can relate to print media sheet processing parameters, including, for example, process speed (i.e., the transit speed, such as mm/s, of sheets traveling in a particular module), sheet transit time (i.e., the elapsed or overall time for a sheet to travel in a module), and pitch period (i.e., the minimum delay or amount of time required between sheets traveling in a module, such as may be needed for sheet tracking sensors to function properly). One or more of the processing parameters can be dependent upon the print media sheet traveling in a module. For example, print media sheets of varying lengths will likely have varying sheet transit times in a particular module. Like step S100, step S102 can occur at any time, such as during initial boot-up or on a continuing basis. When a processing parameter is sheet type specific, step S102 may not be able to occur prior to the module determining what sheet is being used. The processing parameters of each module can be stored in the module's memory (e.g., memory 30 of module 10) and/or derived from the module's controller (e.g., controller 26 of module 10).

At some point, a user will submit a print job, or information that will form or correspond to a print job, to the printing system 40 and the scheduler 92 will receive the print job, or said information forming or corresponding to the print job (step S104). The step of the scheduler 92 receiving the print job need not occur after steps S100 and/or S102, but could occur at any time. As described above, the print job indicates the number of sheets to be printed and possibly specified types of sheets on which the printing system 40 is to print. Alternatively, this information can be derived from the print job or information corresponding to the print job.

Once a print job is received, the scheduler 92 establishes the available paths through the printing system 40 for sheet or sheets of the print job (step S106). In the illustrated method, the scheduler 92 initially establishes the available paths through the printing system 40 of a selected sheet of the print job, such as the first sheet of the print job. Establishing the available paths can be dependent upon which modules are available (reported in step S100), the particular print media processing parameters of each module (reported in step S102), and/or the requirements or instructions associated with each sheet to be printed in the print job. For example, if the print job specifies that a particular sheet is to printed on a particular size of paper, only paths stemming from a tray capable of delivering the desired paper size will be established as being available. In another example, if the print job specifies that a particular sheet is to be printed on two sides, only paths passing through print engine modules which have reported two-sided printing capabilities will be established as being available.

After determining or establishing the available paths, the scheduler 92 determines or calculates the most appropriate or preferred path of the available paths (step S108). In one exemplary embodiment, the preferred path is the path which gets a particular sheet of print media to the finisher module 48 in the least amount of time, i.e., the fastest available path. As described in more detail below, calculating the preferred path of the available paths (step S108) can require the scheduler 92 to consult or lookup a reservation matrix which indicates when particular modules or paths will be available based on previously scheduled print media sheets. Calculating the preferred path can be dependent upon the particular print media processing parameters of each module (reported to the scheduler 92 in step S102). For example, the transit time and the pitch period of a first module through which a first available path passes may be shorter than the transit time and pitch period of a second module through which a second available path passes, in which case the first available path might be preferred where speed is desirable.

After calculating the preferred path of the available paths, the scheduler 92 submits the calculated path to the modules (step S110) and updates the reservation matrix (step S112). More particularly, upon calculation of the preferred path, an itinerary is generated for the print media sheet to be processed along the preferred path. The sheet's itinerary, which is information representative of the path calculated as the preferred path and the time at which the print media sheet is to be sent along the preferred path, is submitted to the modules. In one exemplary embodiment, the sheet's itinerary is sent only to modules tasked with processing the print media sheet and/or the print media path controller 94 sends the itinerary to the modules. In any case, the modules receiving the itinerary are able to use it to determine when the print media corresponding to the itinerary is to be processed. For example, a module, such as module 44, could receive a sheet itinerary and store it in its memory, such as memory 58, or the itinerary could be first directed to the controller, such as controller 56.

The step of updating the reservation matrix (S112) occurs so that subsequently processed sheets, i.e., sheets that are to be scheduled through the printing system 40, can be scheduled in view of the already scheduled print media sheet. For example, if a first of two available paths is determined to be the preferred or fastest path for a first print media sheet, the first path may not be the preferred or fastest path for a second, subsequent print media sheet because the first path may be occupied with processing the first print media sheet. Accordingly, a reservation matrix is stored by the scheduler 92, which details when each module or path will be open for a subsequently processed print media sheet. The reservation matrix can be reviewed or consulted by the scheduler 92 when processing (i.e., calculating a preferred path in step S108) for subsequently processed print media sheets.

After updating the reservation matrix, in step S114, if more sheets remain in a print job being processed or in a subsequently submitted print job, steps S106 through S114 are repeated for subsequent sheet or sheets. More specifically, step S106 is returned to and the available paths are again established for the additional sheets to be processed. After establishing the available paths for the subsequent sheet, the scheduler 92 again determines the preferred available path (S108), but for the subsequent sheet. Determining the preferred available path for the subsequent sheet takes into account the already scheduled itinerary of the already scheduled sheet. More specifically, the scheduler 92 consults the reservation matrix, which indicates when certain paths and/or modules will be available in view of the already scheduled sheet. Thus, when the preferred path is determined for the subsequent sheet, the preferred path is calculated while taking account for the processing of the earlier scheduled sheet. Upon determining the preferred path for the subsequent sheet, the scheduler 92 submits this path to the modules (S110) and updates the reservation matrix to reflect scheduling of the subsequent sheet (S112). The steps (S106-S114) repeat until all sheets are processed.

The scheduling system or scheduler 92 herein described can be implemented either on a single program general purpose computer or a separate program general purpose computer. However, the scheduling system 92 can also be implemented on a special purpose computer, a programmed microprocessor or microcontroller and peripheral integrated circuit element, an ASIC, or other integrated circuit, a digital signal processor, a hardwired electronic or logic circuit such as a discrete element circuit, a programmable logic device such as a PLD, PLA, FPGA, PAL, or the like. In general, any device, capable of implementing a finite state machine that is in turn capable of implementing the scheduler-related steps in the flowchart of FIG. 4 can be used to implement the scheduling system 92.

The disclosed method can be readily implemented in software using object or object-oriented software development environments. Alternatively, the disclosed scheduling system 92 can be implemented partially or fully in a hardware using standard logic circuits or VLSI design. Whether software or hardware is used to implement the system 92 in accordance with the exemplary embodiments is dependent, at least in part, on the speed and/or efficiency requirements of the system, the particular function, and the particular software or hardware systems or microprocessors or microcomputer systems being utilized. The scheduling system 92 and methods described herein, however, can be readily implemented in hardware or software using any suitable systems or structures, devices and/or software known by those skilled in the applicable art without undue experimentation from the functional description provided herein together with a general knowledge of the computer arts.

An example application of the method of FIG. 4 will now be described in connection with the illustrated print system 40 of FIGS. 2 and 3. As shown in FIGS. 2 and 3, the printing system 40 includes four modules 10,44,46,48. In step S100, according to the example, each module 10,44,46,48 reports that it is available. In step S102, according to the example, each module 10,44,46,48 reports its print media processing parameters. More specifically, in this example, each module 10,44,46,48 reports that it has a path or paths and reports the transit time (t) and pitch period (p) associated with each reported path.

More specifically, the marking engine modules 10,44 each report that they have a path available, path 36 on module 10 and path 64 on module 44, and report transit times and pitch periods associated, respectively, with paths 36,64. Likewise, the finisher module 48 reports that it has path 82 and reports a transit time and pitch period associated therewith. Transport module 46 reports that it has paths 74 and 78 and reports a transit time and pitch period associated with each path 74 and 78. In one exemplary example, the reported print media processing parameters are as in TABLE 1.

TABLE 1

| Path | Transit Time (seconds) | Pitch Period (seconds) |
| --- | --- | --- |
| first marking module path 36 | 1.8 | 0.9 |
| second marking module path 64 | 1.7 | 0.9 |
| transport module path 74 | 3.2 | 0.5 |
| transport module path 78 | 1.6 | 0.5 |
| finisher module path 82 | 1.9 | 0.5 |

When a print job is submitted, the print job is received by the scheduler 92 (S104). In the exemplary example, the print job indicates that three (3) sheets are to be printed in simplex form (i.e., one side only). Next, the scheduler establishes the available paths through the printing system 40, based on the print media processing parameters and the print job being processed. In the exemplary example, the three (3) sheets of the print job are available from either print media tray 34 or 62 and can be printed on by either marking engine module 10 or 44. Thus, the total count of available paths through the print system 40 is two (2), including a first print system path, comprising module paths 36,74 and 82, and a second print system path, comprising module paths 64,78 and 82.

Next, the scheduler 92 determines the preferred available path (S106). In the example herein discussed, the preferred path is that which can deliver a print media sheet to the output tray 80 faster. Thus, the scheduler 92 determines the preferred available path, either first print system path 36,74, 82 or second print system path 64,78,82, is the one that can deliver the first sheet of the submitted three-sheet print job to the output tray 80 of the finisher module 48 faster. When determining the preferred path, the scheduler 92 first consults the reservation matrix to determine when specific modules will be available and thereby determines the earliest time a sheet could be released from its tray or trays, first module tray 32 or second module tray 60 in the printing system 40. In this example, the first sheet of the print job is the first sheet submitted to the scheduler 92, so no other sheets have yet been scheduled (alternatively, any previously scheduled sheets have already been processed or printed, so no sheet itineraries remain in the scheduler 92). Accordingly, since no preexisting sheet itineraries remain, the reservation matrix could be as indicated in TABLE 2.

TABLE 2

| Path | Path Available (seconds) |
|---|---|
| first marking module path 36 | $T_0$ |
| second marking module path 64 | $T_0$ |
| transport module path 74 | $T_0$ |
| transport module path 78 | $T_0$ |
| finisher module path 82 | $T_0$ | wherein $T_0$ is approximately the time in which the print job was received by the scheduler 92. Thus, according to the reservation matrix of this example, all of the paths are immediately available, as no reservations/itineraries have yet been made and/or remain in the printing system 40.

Next, still in step S106, the scheduler calculates when the first sheet of the print job would be delivered to the finisher module 48 along each of the available paths taking into consideration the earliest available release times based on the reservation matrix, compares the calculations for each available path and selects the path which will result in the sheet arriving at the finisher module 48 the earliest (i.e., selects the preferred path). In this example, the first printer system path 36,74,82 would deliver the first sheet of the print job to the finisher module 48 in 5 seconds (1.8 second transit time in module 10 and 3.2 second transit time in the transport module 46). The second printer system path 64,78, 82 would deliver the first sheet of the print job to the finisher module 48 in 3.3 seconds (1.7 second transit time in module 44 and 1.6 second transit time in transport module 46). No previous sheets have been scheduled so both paths, as indicated above, are available at $T_0$. Accordingly, the scheduler 92 would select the second path 64,76,82 for the first sheet of the print job.

Next, the scheduler 92 would submit the preferred available path to the modules (S110), including the arrival time and exit times for the first sheet. For example, the first sheet would start in module 44 at $T_0$, enter the transport module at $T_0+1.7$ seconds (transit time through module 44), and enter the finisher at $T_0+1.7$ seconds+1.6 seconds (transit time through module 46). In one exemplary embodiment, only the modules 44,46,48 that are to process the print job receive information from the scheduler 92. The scheduler 92 also updates the reservation matrix (S112). After processing the first sheet of the print job, the reservation matrix could be as indicated in TABLE 3.

TABLE 3

| Path | Path Available (seconds) |
|---|---|
| first marking module path 36 | $T_0$ |
| second marking module path 64 | $T_0 + 0.9$ |
| transport module path 74 | $T_0$ |
| transport module path 78 | $T_0 + 1.7 + 0.5 = T_0 + 2.2$ |
| finisher module path 82 | $T_0 + 1.7 + 1.6 + 0.5 = T_0 + 3.8$ |

In other words, the second marking module 44 will be able to take another sheet in $T_0+0.9$ (wherein 0.9 second is the pitch period for the second module 44). The first marking module 10, since it still does not have a sheet schedule, can take a sheet as soon as the print job arrives, likewise with the first transport module path 74. The second transport module path 78 can take another sheet after 2.2 seconds (includes 1.7 seconds transit time through second module 44 and 0.5 seconds pitch period for the transport module). The finisher module 48 can take a second sheet in 3.8 seconds, which includes transit times through the second module 44 and the second path 78 of the transport module 46 (1.7 seconds for second module 44 and 1.6 seconds for path 78), and a pitch period of 0.5 seconds for the finisher.

Because two more sheets remain to be processed in the example, step S114 directs back to step S106, wherein the scheduler 92 determines all available paths for the second sheet of the three sheet print job. As indicated above, both paths 36,74,82 and 64,78,82 are available for all sheets of the example print job. Next, the scheduler determines the preferred available path for the second sheet of the print job (S108). Again, the earliest the second sheet could be released for each path is calculated. Since the first path 36,74,82 has no sheets scheduled, a sheet could be released from tray 32 in the first path at $T_0$. As with the first sheet, the first path could deliver a sheet to the finisher module 48 in 5 seconds.

The second path 64,78,82 already has a sheet scheduled. Accordingly, the earliest the second sheet could be released from the tray 60 is the maximum of (1) when the second module path is free (0.9 seconds from reservation matrix), (2) when the transport module second path 78 is free less the transit time through the second module 44 (2.2 seconds from the reservation matrix−1.7 seconds transit time through second module 44=0.5 seconds), and (3) when the finisher path 82 is free less the transit time through the modules 44,46 (3.8 seconds from reservation matrix−1.6 seconds−1.7 seconds=0.5 seconds), or 0.9 seconds. Including the 0.9 second delay, the second sheet could be to the finisher in 4.2 seconds, which is still less than the 5 seconds required to get the second sheet through the first path 36,74,82. Accordingly, the second path 64,78,82 is also selected for the second sheet of the print job.

Next, the scheduler 92 would submit the preferred available path for the second sheet to the modules (S110), including the arrival time and exit times for the second sheet. The scheduler 92 also again updates the reservation matrix (S112). After processing the second sheet of the print job, the reservation matrix could be as indicated in TABLE 4.

TABLE 4

| Path | Path Available (seconds) |
| --- | --- |
| first marking module path 36 | $T_0$ |
| second marking module path 64 | $T_0 + 1.8$ |
| transport module path 74 | $T_0$ |
| transport module path 78 | $T_0 + 3.1$ |
| finisher module path 82 | $T_0 + 4.7$ |

Specifically, the second module 44 would have another 0.9 second pitch period added increasing the previous value, $T_0+0.9$ seconds, to $T_0+1.8$ seconds. Likewise, the transport module path 78 and the finisher module path 82 each have another 0.9 seconds pitch period added, respectively. The first module 10 and the first transport module path 74 are both still available at $T_0$. For the third sheet of the print job, the steps (S106-S112) are again repeated. This time, however, the first path 36,74,82 is faster for delivering the third sheet to the finisher module 48 and is selected as the preferred available path.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for scheduling individual sheets of a print job in a printing system comprising a plurality of modules, the method comprising:
   (a) submitting a print job comprising one or more sheets to be printed to said printing system;
   (b) determining available paths through the plurality of modules for one of said one or more sheets of said print job;
   (c) determining a preferred available path for said one of said one or more sheets of said print job from said available paths;
   (d) submitting said preferred available path for said one of said one or more sheets of said print job to one or more of said plurality of modules;
   (e) updating a reservation matrix representative of said one of said one or more sheets being scheduled on said preferred available path; and
   (f) repeating steps (b) through (e) for each subsequent sheet of said one or more sheets of said print job.

2. The method of claim 1 further including at least one of the steps of:
   reporting availability of each of said plurality of modules; and
   reporting print media processing parameters for each of said plurality of modules.

3. The method of claim 2 wherein the step of determining said available paths includes the substep of:
   using one or more of (i) said availability of said modules, (ii) said print media processing parameters of said plurality of modules, and (iii) said print job to determine said available paths.

4. The method of claim 2 wherein the step of reporting print media processing parameters includes reporting the print media processing parameters related to print media paths through said modules.

5. The method of claim 4 wherein said print media processing parameters include one or more of (i) sheet transit time for each path through said modules; (ii) process speed for each path through said modules and (iii) pitch period for each path through said modules.

6. The method of claim 5 wherein said print media processing parameters are dependent upon said one of said one or more sheets of said print job.

7. The method of claim 4 wherein said step of determining said preferred available path is dependent upon said print media processing parameters reported.

8. The method of claim 1 wherein said plurality of modules includes at least a first marking engine module and a second marking engine module.

9. The method of claim 8 wherein said plurality of modules further includes a transport module and a finisher module.

10. The method of claim 1 wherein step (f) includes the substep of:
    determining a preferred available path for a second of said one or more sheets of said print job from said available paths in view of said one of said one or more sheets of said print job already being scheduled.

11. The method of claim 1 wherein said print job indicates the number of sheets to be printed and optionally specified types of sheets on which said print job is to be printed.

12. The method of claim 1 wherein the step of determining said preferred available path includes determining which of said available paths will deliver said one of said one or more sheets of said print job to an output tray of said printing system in the least amount of time.

13. The method of claim 1 wherein said step of determining said preferred available path includes the substep of consulting said reservation matrix to determine when each of said modules will be available based on any previously scheduled print media sheets in said printing system.

14. The method of claim 1 wherein said step of determining said preferred available path includes the substeps of:
    calculating when said one of said one or more sheets would be delivered to an output tray along each of said available paths, including taking into consideration the earliest available release times of each of said modules from said reservation matrix;
    comparing calculations of when said one of said one or more sheets would be delivered to said output tray; and
    selecting said preferred available path as the path which will result in said one of said one or more sheets being delivered to said output tray the earliest.

15. A printing system, comprising:
    at least two modules, including at least one marking engine module;
    a data source having image data which is to be printed on one or more print media sheets; and
    a scheduler linked to said data source and linked to said at least two modules for scheduling processing of said one or more print media sheets on which said image data is to be printed through said at least two modules, each of said one or more print media sheets of said print job able to be scheduled through one or the other of said at least two modules depending on which of said at least two modules provides a preferred path in view of other print media sheets already scheduled through said at least two modules.

16. The printing system of claim 15 wherein said at least two modules includes at least two marking engine modules.

17. The printing system of claim 16 wherein said at least two modules further includes at least one of a finisher module for collecting all of said one or more print media sheets and a transport module for transporting said one or more print media sheets to said finisher module from said at least two marking engine modules.

18. The printing system of claim 17 wherein a first printing system path is defined through said at least two modules and a second printing system path is defined through said at least two modules, said scheduler configured to select said first printing system path or said second printing system path for each of said one or more print media sheets for providing said one or more print media sheets to said finisher module in the least amount of time.

19. The printing system of claim 15 wherein said scheduler includes a reservation matrix that is updated as each of said one or more sheets is scheduled through said at least two modules for recording when each of said at least two modules will be available.

20. A xerographic system, comprising:

a first marking engine module which applies images to print media sheets;

a second marking engine module which applies images to print media sheets; and a scheduler linked to said first and second marking engine modules for receiving a print job and scheduling sheets of said print job through said first and second marking engine modules to minimize time of said sheets passing through said first and second marking engine modules, individual sheets of said print job each capable of being scheduled for passage through said first marking engine module and/or said second engine marking module for determining a preferred available path through said first and second marking engine modules that considers already scheduled sheets of said print job.

* * * * *